United States Patent [19]
Grantz et al.

[11] Patent Number: 5,564,038
[45] Date of Patent: Oct. 8, 1996

[54] METHOD AND APPARATUS FOR PROVIDING A TRIAL PERIOD FOR A SOFTWARE LICENSE PRODUCT USING A DATE STAMP AND DESIGNATED TEST PERIOD

[75] Inventors: Jeffrey A. Grantz, Boca Raton; J. Robert Ure, Coral Springs, both of Fla.

[73] Assignee: International Business Machines Corporation, Armonk, N.Y.

[21] Appl. No.: 246,648

[22] Filed: May 20, 1994

[51] Int. Cl.$^6$ .............................. G06F 9/24; G06F 12/14
[52] U.S. Cl. .............................. 395/491; 380/25; 380/4; 340/825.31; 364/DIG. 1; 364/DIG. 2
[58] Field of Search ................... 395/800, 700, 395/575, 200, 275, 725, 600, 650, 491, 200.09, 934; 364/406, 464.01, DIG. 1, DIG. 2, 401; 380/4, 25, 48, 23; 340/825.31, 825.34, 825.54; 370/60, 62

[56] References Cited

U.S. PATENT DOCUMENTS

| | | |
|---|---|---|
| 4,658,093 | 4/1987 | Hellman ........................... 380/25 |
| 4,740,890 | 4/1988 | William ............................ 395/575 |
| 4,796,181 | 1/1989 | Wiedemer ........................ 364/406 |
| 4,864,494 | 9/1989 | Kobus, Jr. ........................ 395/575 |
| 4,885,778 | 12/1989 | Weiss ............................... 380/48 |
| 4,924,378 | 5/1990 | Hersey et al. .................... 395/200 |
| 4,932,054 | 6/1990 | Chou et al. ....................... 380/4 |
| 4,937,863 | 6/1990 | Robert et al. .................... 380/4 |
| 5,014,239 | 5/1991 | Edwards, Jr. .................... 395/575 |
| 5,038,293 | 8/1991 | Coudman ......................... 364/479 |
| 5,058,162 | 10/1991 | Santon et al. .................... 380/25 |
| 5,103,476 | 4/1992 | Waite et al. ...................... 380/4 |
| 5,343,529 | 8/1994 | Mu et al. .......................... 380/49 |
| 5,386,369 | 1/1995 | Christiano ........................ 364/464.01 |

*Primary Examiner*—Daniel H. Pan
*Attorney, Agent, or Firm*—Jeffrey S. LaBaw

[57] ABSTRACT

A method is provided to permit copies of software products to be installed on systems, with a predetermined delay before commencement of a designated test period. The predetermined delay provides for a cumulative elapsed time, beginning with the installation of the software product to be evaluated during the designated test period, to allow for miscellaneous starts of the computer system prior to productive use for the purpose of evaluation during the user trial period. The miscellaneous starts may be associated with software product installation procedures during preload activities, attachment of devices and/or adapters to tailor the system to a particular user configuration, or to otherwise "boot" or check the system prior to productive use.

4 Claims, 3 Drawing Sheets

METHOD AND APPARATUS FOR PROVIDING A TRIAL PERIOD FOR A SOFTWARE LICENSE PRODUCT USING A DATE STAMP AND DESIGNATED TEST PERIOD

BACKGROUND OF THE INVENTION

1. Field of the Invention

The invention relates generally to the field of digital data processing systems, and more specifically to a method for managing access to, and authentication of, an operating system or various application software program products which may be processed by the systems to ensure that the operating system or application software program products are used according to the terms of the product's license agreements.

2. Description of Related Art

Growth in the personal computer industry has created a large market for operating system and application software products usable on particular personal computer systems. Accordingly, companies are in the business of developing operating system and application software products which are then marketed to personal computer owners. Typically, such computer software products are marketed on a fixed fee basis in which a user purchases a copy of the software, usually under terms of a license agreement. It has been a characteristic of this industry that in order for the developers of the software to recover the often quite large investment in research and development of the software product, and also the costs of manufacture and marketing, that the purchase price of such software items has been relatively high. This high purchase price has been a barrier, in some circumstances, to the widespread licensing of some software and has limited the penetration in some markets. In addition, some users are reluctant to incur such a purchase without first operating the software, since the suitability of software is very difficult to judge without actually using it.

In order to afford users an opportunity to evaluate a particular operating system or application software product, a developer may offer the user a "trial period" during which the user is granted the right to use the operating system or application software product. Upon expiration of the trial period, the user may either license the product or stop using the product.

Growth in the personal computer industry has also led many personal computer systems manufacturers to "preload" operating system and/or certain application software products on the systems. The preloaded systems may be marketed as "turn-key" solutions, whereby the user is not required to install the software product(s) and may begin useful operation shortly after turning the system on. In addition, preloaded software products may be used by a software vendor as a method of introducing the user to a particular software product(s), which the user may purchase upon the expiration of a trial period.

As is well known, a major problem with regard to the distribution of such software products is the copying of such products or the unauthorized use of such products without compensating the developer for their value. Unauthorized use of proprietary computer programs is widespread. The problem of unauthorized use is exacerbated when software products are offered for use during a trial period. Upon expiration of the trial period, without a means for managing license verification of the software product, the user may continue using the software product without compensating its developer.

Various methods have been employed for preventing the use of programs by persons who have obtained them in an unauthorized manner. For example, U.S. Pat. No. 5,014,234 to Edwards is for a System with Software Usage Timer and Counter for Allowing Limited Use But Preventing Continued Unauthorized Use Of Protected Software. Edwards discloses providing a clock having an initial time setting at the time of installation of a software product on a computer system, a constant representing a predetermined amount of time, and a counter. Each time the protected software is operated, the counter is incremented. Determinations are made whether the counter has reached a predetermined value, or whether the current time sensed exceeds the time when the software was installed by an amount equal to or greater than the constant. If the result of either determination is true, a warning is sent to the user and the counter is decremented each further time that the software is subsequently operated. Finally, the software is disabled when the counter has reached a second predetermined value.

The system as disclosed in Edwards, may fail to provide the user an adequate trial period for a system having a software product(s) that have been preloaded. That is, when preloading software products, Edwards would begin to track a user trial period at the time of preloading. As a result, the length of the trial period realized may be less than the length of the trial period designated by the developer. It is envisioned that no trial period could result in a circumstance when the time at which the computer system is purchased and activated by a user exceeds the time at which the software products were preloaded by an amount greater or equal to the test period.

SUMMARY OF THE INVENTION

According to the invention, a method and apparatus are provided for preventing continued use of a protected computer program product in a data processing system beyond a designated test period. The data processing system includes a date stamp, and timer, wherein the date stamp represents the start of the designated test period, and the timer measures elapsed time after the protected computer program product is installed and before the commencement of the designated test period. According to one aspect of the invention, a determination is made as to whether the date stamp has been created. If the date stamp has been created a determination is made as to whether the current date exceeds the date associated with the date stamp by an amount greater than the designated test period; and if the designated test period is exceeded the protected computer program is disabled. Otherwise, the timer is incremented in order to measure elapsed time of the data processing system while active. A determination whether the timer has reached a predetermined value is made and after the predetermined value has been reached, the date stamp is created. After the date stamp has been created the system compares the current date to the date associated with the date stamp, and if the designated test period is exceeded the protected computer program is disabled.

BRIEF DESCRIPTION OF THE DRAWING(S)

The subject matter which is regarded as the invention is particularly pointed out and distinctly claimed in the concluding portion of the specification. The invention, however, both as to organization and method of practice, together with further objects and advantages thereof, may be best understood by reference to the following description taken in conjunction with the accompanying drawing figures.

DESCRIPTION OF THE ILLUSTRATIVE EMBODIMENT(S)

The following detailed description is of the best presently contemplated mode for carrying out the invention. This description is not to be taken in a limiting sense but is made merely for the purpose of illustrating the general principles of the invention since the scope of the invention is best defined by the appending claims.

The invention may be run on a variety of computers under a number of different operating systems. The computer could be, for example, a personal computer, a mini computer, or a main frame computer. The computer may be a standalone system, part of a network such as a local area network or wide area network or a larger teleprocessing system. For purposes of illustration only, the invention is described as implemented on a personal computer, such as IBM's PS/2® computer series, although the specific choice of computer is limited only by memory and disk requirements.

Figure 1:
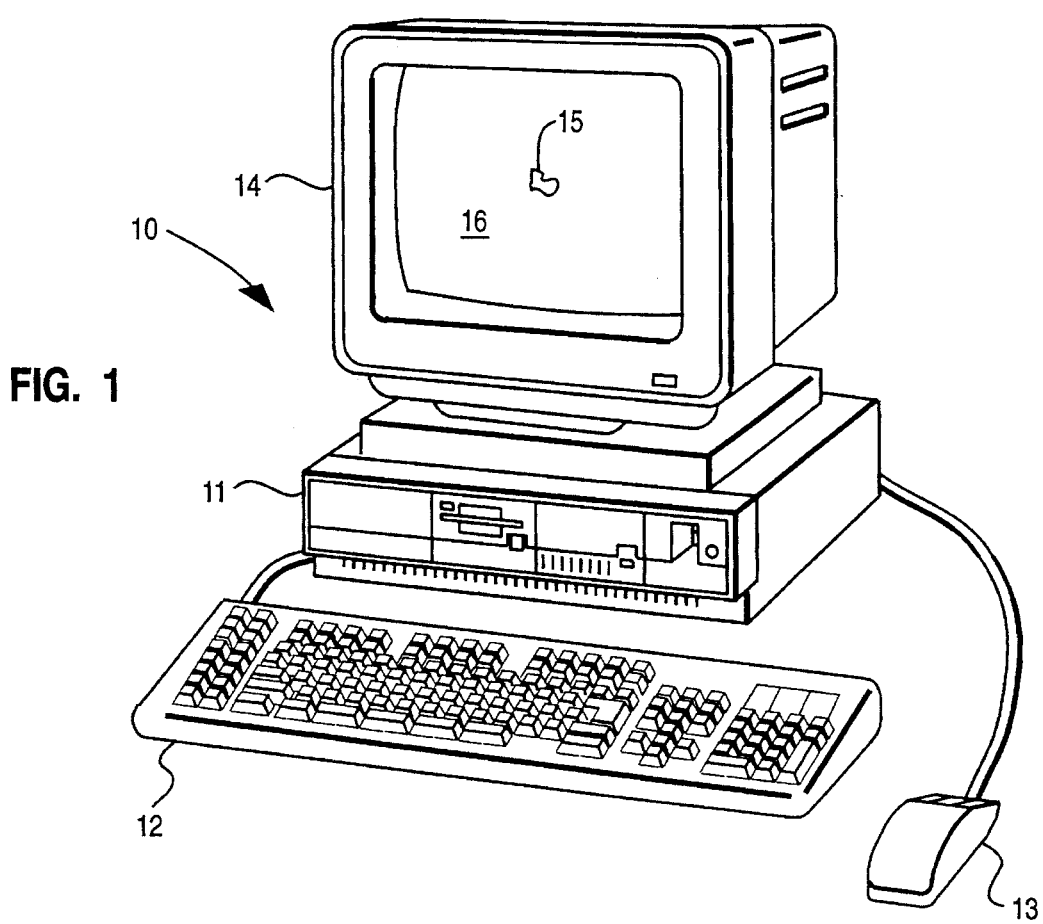
FIG. 1 shows a personal computer comprising a system unit, keyboard, mouse and display.

Referring now to the drawings, and more particularly to FIG. 1, there is shown a personal computer system 10, comprising a system unit 11, a keyboard 12, a mouse 13 and a graphics display device or monitor 14. The keyboard 12 and the mouse 13 constitute user input devices, and the display device 14 is a user output device. The mouse 13 is used to control a cursor 15 displayed on the screen 16 of the display device 14.

Figure 2:
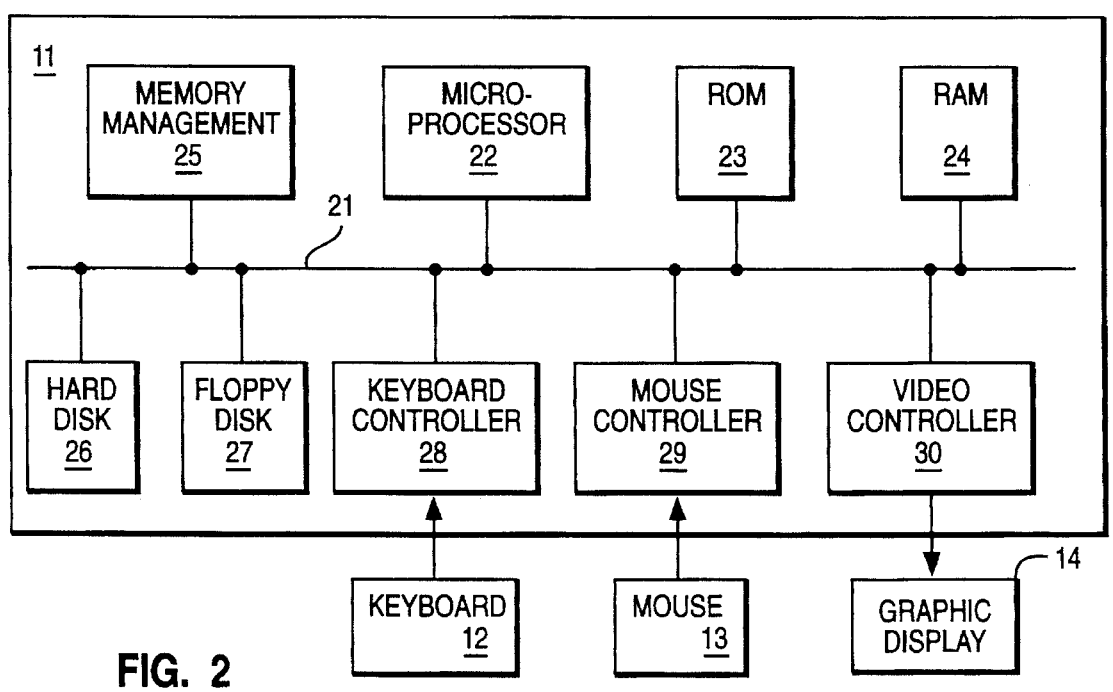
FIG. 2 shows a block diagram of the components of the personal computer shown in FIG. 1.

FIG. 2 shows in block diagram form the components of the personal computer shown in FIG. 1. The system unit 11 includes a system bus 21 to which the various components are attached and by which communication between the various components is accomplished. A microprocessor 22 is connected to the system bus 21 and is supported by read only memory (ROM) 23 and random access memory (RAM) 24, also connected to system bus 21. The microprocessor 22 in the IBM PS/2 series of computers is one of the Intel family of microprocessors including the 80286, 80386 or 80486 microprocessors, but other microprocessors including, but not limited to, Motorola's family of microprocessors such as the 68000, 68020 or 68030 microprocessors and various RISC (Reduced Instruction Set Computer) microprocessors manufactures by IBM, Hewlett-Packard, Sun Microsystems, Intel, Motorola and others may be used in a specific computer.

The ROM 23 contains, among other code, the Basic Input/Output System (BIOS) which controls basic hardware operations, such as interactions of the disk drives and the keyboard. The RAM 24 is the main memory into which the operating system, data files and application programs are loaded. A memory management chip 25 is connected to the system bus 21 and controls Direct Memory Access (DMA) operations, including paging data between RAM 24 and a hard disk drive 26 and a floppy disk drive 27.

To complete the description of the system unit 11, there are three I/O controllers. These are the keyboard controller 28, the mouse controller 29, and the video controller 30, all of which are connected to the system bus 21. As the names imply, the keyboard controller 28 provides the hardware interface for the keyboard 12, the mouse controller 29, hardware interface for the mouse 13, and the video controller 30 provides the hardware interface for the graphic display device 14.

The hardware illustrated in FIGS. 1 and 2 is typical but may vary for a specific application; that is, there may be other peripherals, such as optical storage media, audio I/O, printers and the like. The invention is specifically directed to an enhancement to the operating system which controls or "runs" the hardware or an application software program which runs under the control of the operating system. The invention may be added to an existing operating system or application software program, or it may provide the basis of an entirely new operating system or application software program.

Figure 3:
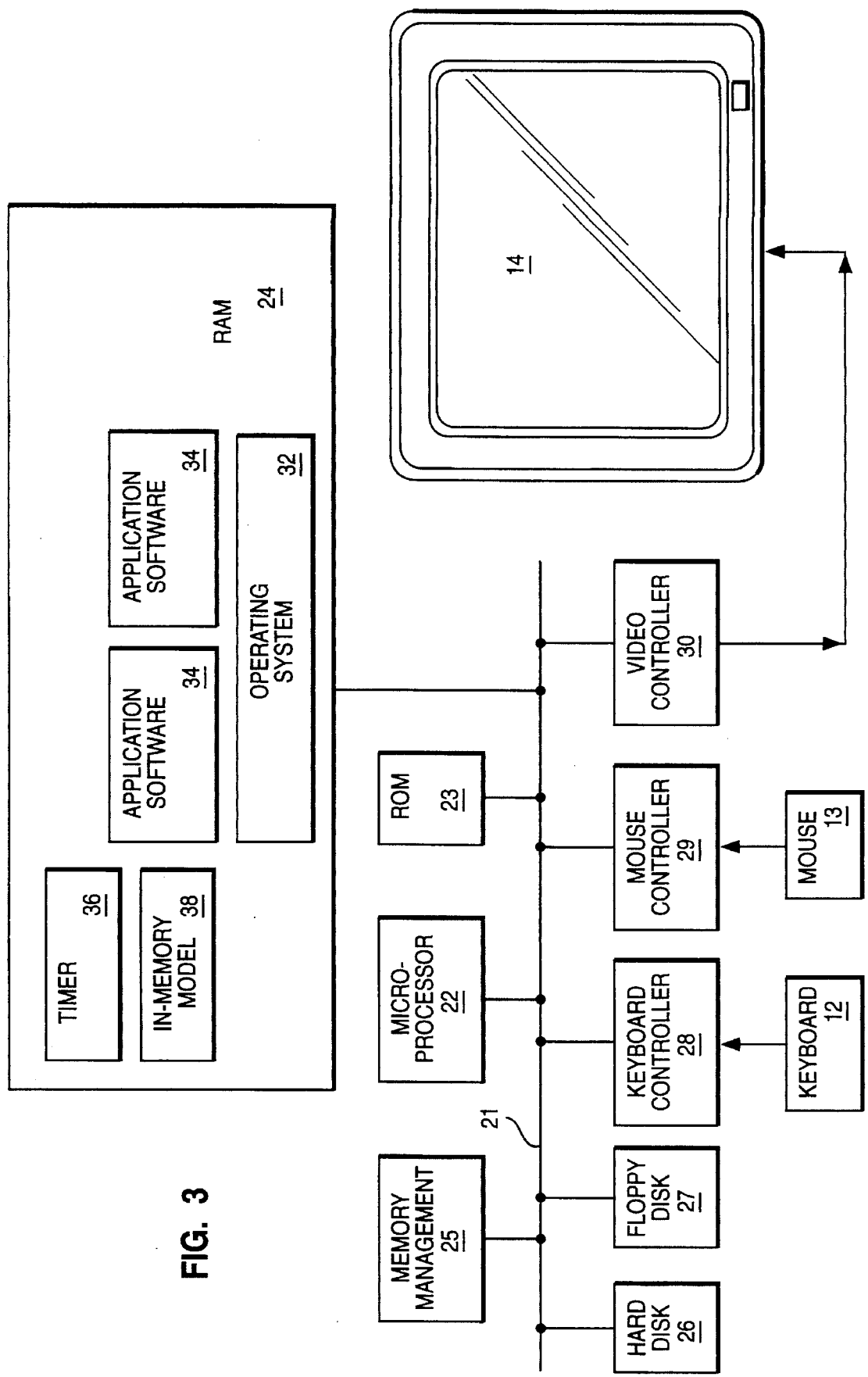
FIG. 3 shows a computer system with in-memory components for allowing a trial period according to the present invention.

The manner in which the invention is implemented may differ from operating system to operating system, or from application software program to application software program. One possible embodiment is illustrated in FIG. 3. The RAM 24 may contain, among other code, operating system 32, one or more application software programs 34, timer 36 for keeping track of cumulative elapsed time that the data processing system 10 is active, and an in-memory model 38 for storing a date stamp.

When the user elects to start by "booting" the system 10, registration data will be tested for the protected computer program product. The "protected computer program product" may be either operating system 32 or application software product 34, whichever is the product to be protected. As the protected computer program is loaded, timer 36 is started and incremented while the data processing system 10 is operated until a predetermined value of time is reached. Having reached the predetermined value, a date stamp is created and stored in in-memory model 38. Thereafter, the current date will be compared to the date associated with the date stamp to establish whether a designated test period has been exceeded. Upon expiration of the designated test period, the computer program may be disabled or destroyed.

Although timer 36 and in-memory model 38 are shown as discrete elements in FIG. 3, either may be integral to the protected computer program product. That is, timer 36 or in-memory model 38 representing the date stamp may be functionally part of either operating system 32 or application software product 34. Moreover, the contents of timer 36 and in-memory model 38 are stored, for example on hard disk 26, so as to preserve the contents of each during a first use of the protected computer program product and each subsequent use of the protected computer program product.

The software which will now be described functions to prevent continued unauthorized use of protected software products beyond a designated test period and to manage access to, and authentication of, the protected software products. The method hereinafter described permits copies of software products to be installed on systems, with a predetermined delay before commencement of the test period. The predetermined delay provides for a cumulative elapsed time, beginning with the installation of the software product to be evaluated during the test period, to allow for miscellaneous starts of the computer system prior to productive use for the purpose of evaluation during the user trial period. The miscellaneous starts may be associated with software product installation procedures during preload activities, attachment of devices and/or adapters to tailor the system to a particular user configuration, or to otherwise "boot" or check the system prior to productive use.

Figure 4:
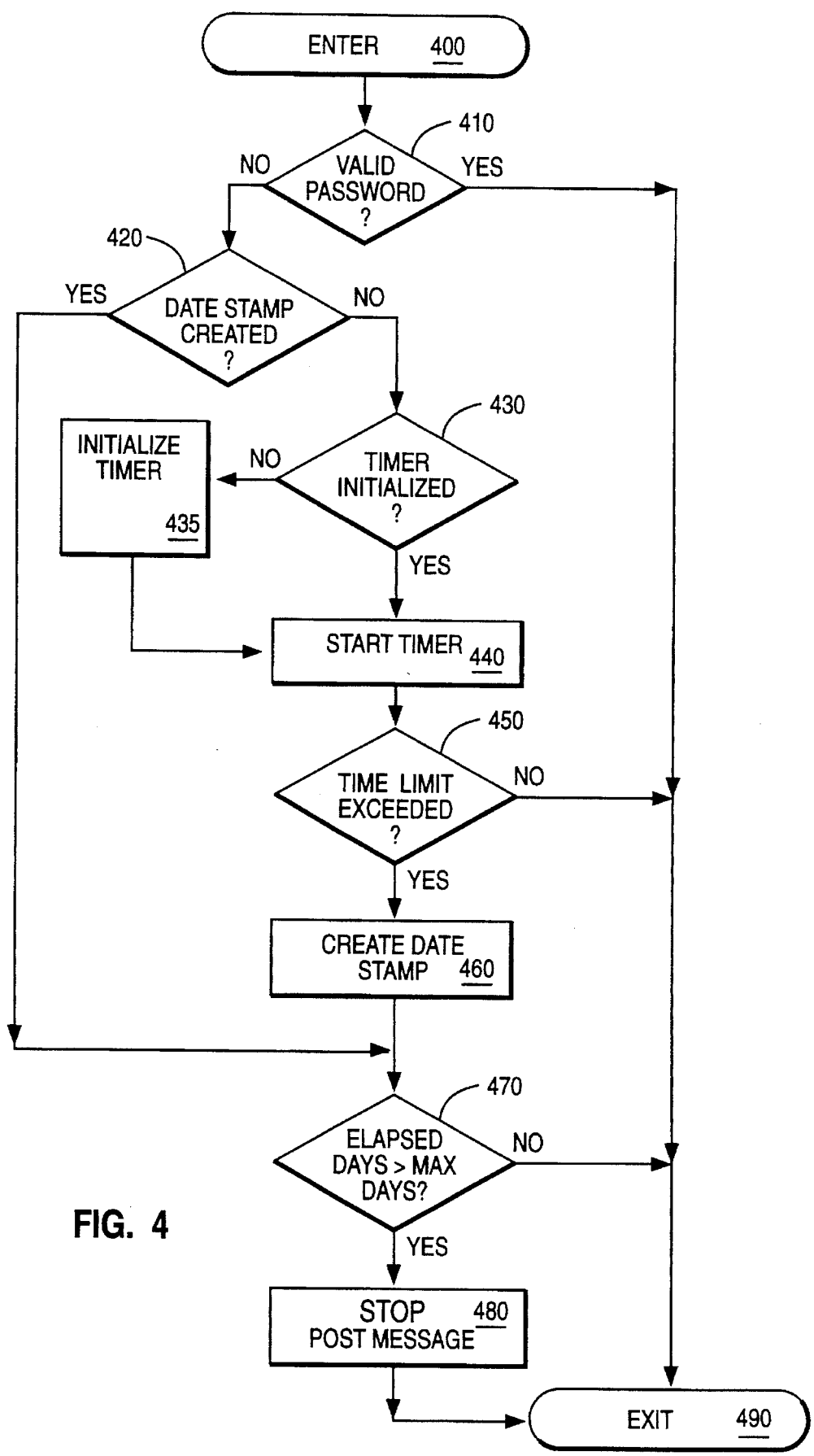
FIG. 4 is a flow chart illustrating a method for allowing a trial period according to the present invention.

The flow diagram in FIG. 4 shows a possible mode of operation of the invention. In the flow diagram, the graphical conventions of a diamond for a test or decision and a rectangle for a process or function are observed. These conventions are well understood by programmers skilled in the art, and the flow diagram is sufficient to enable a programmer of ordinary skill to write code in any suitable computer programming language such as BASIC, Pascal, or C for a computer, such as the IBM Personal Series (PS/2) family of computers which supports those languages.

Block 410 begins, after first entering from block 400, by checking whether a valid password has been entered during the start up or loading of the protected computer program product. The determination may be made by prompting the user to input the valid password every time the protected computer program product is loaded. Alternatively, a register or field for storing the valid password may be examined in order to verify that the valid password had been previously entered by the user and stored. If the valid password has, in fact, been entered, the YES branch of decision block 410 serves as input to block 490, where the procedure exits and continues with loading the protected computer program product. Otherwise, the NO branch of decision block 410 serves as input to decision block 420, where the system determines whether a date stamp has been created. If no date stamp has been created, the NO branch of decision block 420 is taken to block 430, where the system determines whether timer 36 has been initialized. If it is determined that timer 36 has not been initialized, the NO branch of decision block 430 is taken to block 435 where timer 36 is initialized. Having initialized timer 36, block 435 serves as input to block 440. Referring again to decision block 430, if it is determined that timer 36 had been previously initialized, the YES branch is taken to block 440. Block 440 activates timer 36 to measure time elapsed during the operation of the protected computer program product. It is to be understood, that the time measured by timer 36 begins with the total cumulative elapsed time counted during every prior operation of the protected computer program product. That is, timer 36 stores the cumulative time of every prior operation of the protected computer program product, and resumes its count during the current operation of the protected computer program product. Having started timer 36, block 440 serves as input to decision block 450 where it is determined whether timer 36 has reached a predetermined limit. If the predetermined limit has not been reached, the NO branch of decision block 450 is taken to block 490, where the procedure exits and continues with loading the protected computer program product. Otherwise, the YES branch of decision block 450 is taken to block 460, where a date stamp is created.

The date stamp indicates the time upon which the timer 36 has reached its predetermined value. Accordingly, the date stamp has a date associated therewith, indicating the time at which timer 36 has reached the predetermined value and the time at which an authorized test period is begun. In so doing, timer 36 serves to provide a "burn-in" period to allow a user to start the system 10 prior to undertaking productive use of the protected computer program product in order to perform a meaningful test. It is to be understood that the authorized test period will begin only after the date stamp is created, and that the date stamp is only created upon the timer 36 reaching the predetermined value. It is to be further understood that although shown in RAM 24, timer 36 may be implemented as a discrete hardware component in system 10. In the illustrative embodiment, the predetermined value, for the time of the "burn-in" period, is 24 hours.

Referring back to block 420, the YES branch of decision block 420 and the output of block 460 serve as input to decision block 470, where it is determined whether the time associated with the designated test period has been exceeded. In the illustrative embodiment of the invention, the difference between the current date and the date associated with the date stamp is compared to the designated test period. In the illustrative embodiment, the designated test period is set at 60 days. However, the designated test period is typically determined by the developer or according to the terms of the license agreement. If it is determined that the elapsed days do not exceed the designated test period, the NO branch of decision block 470 is taken to block 490, where the procedure exits and continues with loading the protected computer program product. Otherwise, the YES branch of decision block 470 is taken to block 480, where the load procedure stops. In the illustrative embodiment block 480 includes posting a message to the user that the valid password must be entered in order to access the protected computer program product.

While the invention has been particularly shown and described with reference to one embodiment thereof, it will be understood by those skilled in the art that various changes in form and detail may be made without departing from the spirit and scope of the invention.

What is claimed is:

1. A method for preventing continued use of a protected computer program in a data processing system beyond a designated test period, said data processing system including a valid password, date stamp, and timer, said method comprising the steps of:

(a) providing an initial time setting for said timer at the time of installation of said protected computer program in said data processing system;

(b) making a determination as to whether said valid password has been entered;

(c) continuing with step (d) if said valid password has not been entered;

(d) making a determination as to whether said date stamp has been created;

(e) continuing with step (i) said date stamp has been created;

(f) incrementing said timer to measure cumulative elapsed time of said data processing system while active:

(g) incrementing said timer to measure cumulative elapsed time of said data processing system while active:

(h) creating said date stamp if said predetermined value has been reached;

(i) making a determination as to whether the current date exceeds the date associated with said date stamp by an amount equal to or greater than said test period; and (j) if the result of making said determination in step (i) is true, causing the protected computer program to be disabled.

2. The method as in claim 1 further comprising the step of:
   sending a message to the user indicating that said valid password is required for use of said protected computer program beyond said test period.

3. The method as in claim 1 wherein said predetermined value is 24 hours.

4. The method as in claim 1 wherein said designated test period is 60 days.

\* \* \* \* \*